United States Patent
Zitzmann

[11] Patent Number: 5,853,793
[45] Date of Patent: Dec. 29, 1998

[54] METHOD FOR PRODUCING A SENSOR FOR SENSING A TEMPERATURE AND/OR A FLOW

[75] Inventor: Heinrich Zitzmann, Lauf an der Pegnitz, Germany

[73] Assignee: Sensotherm Temperatursensorik GmbH, Nürnberg, Germany

[21] Appl. No.: 765,749

[22] PCT Filed: Jul. 11, 1995

[86] PCT No.: PCT/EP95/02689

§ 371 Date: Feb. 28, 1997

§ 102(e) Date: Feb. 28, 1997

[87] PCT Pub. No.: WO96/01983

PCT Pub. Date: Jan. 25, 1996

[30] Foreign Application Priority Data

Jul. 12, 1994 [DE] Germany ............... 9411235 U

[51] Int. Cl.⁶ ............... B05D 5/12; B05D 3/02; B05D 1/38

[52] U.S. Cl. ............... 427/8; 427/126.5; 427/375; 427/376.6; 427/376.7; 427/383.5; 427/404

[58] Field of Search ............... 427/126.5, 8, 372.2, 427/375, 376.6, 376.7, 376.3, 383.5, 404

[56] References Cited

U.S. PATENT DOCUMENTS

| | | | |
|---|---|---|---|
| 4,146,957 | 4/1979 | Toenshoff et al. | 612/29 |
| 4,288,774 | 9/1981 | Takami et al. | 338/34 |
| 4,430,191 | 2/1984 | Sone et al. | 204/401 |
| 4,655,892 | 4/1987 | Satta et al. | 204/192.15 |
| 4,688,015 | 8/1987 | Kojima et al. | 338/34 |
| 4,808,274 | 2/1989 | Nguyen | 204/15 |
| 5,008,136 | 4/1991 | Chamberlain | 427/388.1 |
| 5,236,569 | 8/1993 | Murase et al. | 204/412 |
| 5,250,394 | 10/1993 | Wei | 430/313 |

OTHER PUBLICATIONS

Elektrotechnik Und Maschinenbau, Bd. 103, Nr. 1, Januar 1985 Wiet AT, Seiten 22–26, T.F.E. Walla et al. "Dickschichttemperatursensoren" siehe Seite 23.

Patent Abstracts of Japan, vol. 12 No. 220 (P–270), 23 Juni 1988 & JP,A,63 016255 (Fuji Electric Co. Ltd) 23 Januar 1988, Siehe Zusammenfassung.

Patent Abstracts of Japan, vol. 17 No. 81 (E–1321), 18 Februar 1993 & JP,A,04 279003 (Fuji Xerox Co. Ltd) 5 Oktober 1992, Siehe Zusammenfassung.

*Primary Examiner*—Shrive Beck
*Assistant Examiner*—Michael Barr
*Attorney, Agent, or Firm*—Wolf, Greenfield & Sacks, P.C.

[57] ABSTRACT

A method for producing a sensor which is used for sensing a temperature and/or a flow and which comprises a carrier and a structured resistance layer arranged on said carrier, comprises the steps of providing a mixture consisting of platinum resinate paste and a rhodium resinate paste, printing the mixed resinate paste by means of a screen printing process onto an aluminium oxide substrate, drying the paste which has been applied by printing, burning in the paste at such a temperature for such a period of time that a resinate component contained in the layer will be burnt out, repeating the last-mentioned three steps on the same substrate until a desired overall layer thickness has been obtained, and tempering the substrate with the whole layer so as to obtain a high and stable temperature coefficient.

6 Claims, 1 Drawing Sheet

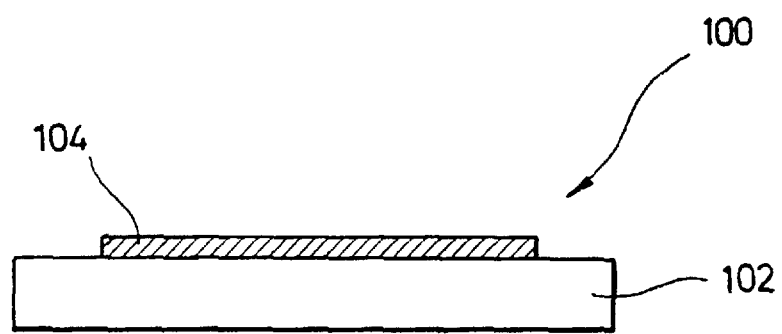

METHOD FOR PRODUCING A SENSOR FOR SENSING A TEMPERATURE AND/OR A FLOW

FIELD OF THE INVENTION

The present invention refers to a method for producing a sensor for sensing a temperature and/or a flow.

BACKGROUND OF THE INVENTION

Sensors used for sensing a temperature and/or a flow and comprising a carrier and a structured resistance layer on said carrier are already known from the prior art. In the case of these known sensors, the resistance layer comprises e.g. a pure platinum layer having arranged thereon additional layers. In view of the structure described hereinbefore, these known sensors permit only a very inexact adjustment of a predetermined temperature coefficient. This results in instable temperature coefficient values so that the measured values detected are not reliable due to this instability.

The Patent Abstracts of Japan, Vol. 12, No. 220 (P-720) discloses a sensor consisting of a ceramic carrier and a resistance layer of Pt-Rh. The resistance layer is produced by applying a Pt-Rh paste to a substrate with the aid of screen printing and subsequent burning.

The Patent Abstracts of Japan, Vol. 17, No. 81 (E-1321) discloses the measure of producing a uniform resistance layer from a paste. The starting material used is a solution of at least one organo-metallic compound. Rh-Pt compounds are mentioned among other compounds.

SUMMARY OF THE INVENTION

It is the object of the present invention to provide a process for producing a sensor which permits an exact adjustment of the temperature coefficient of said sensor.

The present invention provides a method for producing a sensor which is used for sensing a temperature and/or a flow and which comprises a carrier and a structured resistance layer arranged on said carrier, comprising the following method steps:

providing a mixture consisting of platinum resinate paste and a rhodium resinate paste;

printing the mixed resinate paste by means of a screen printing process onto an aluminium oxide substrate;

drying the paste which has been applied by printing;

burning in the paste at such a temperature for such a period of time that a resinate component contained in the layer will be burnt out;

repeating the last-mentioned three method steps on the same substrate until a desired overall layer thickness has been obtained; and tempering the substrate with the whole layer so as to obtain a high and stable temperature coefficient.

The present invention is based on the finding that, instead of the plurality of layers used in the prior art, viz. the platinum layer having applied thereto additional layers, a single layer is more suitable for adjusting the temperature coefficient. This resistance layer contains a mixture of platinum and rhodium, whereby an exact adjustment of the temperature coefficient is possible.

BRIEF DESCRIPTION OF THE DRAWING

In the following, one preferred embodiment of the present invention will be explained in detail making reference to the drawing enclosed, in which:

FIG. 1 shows a sectional view of a sensor for sensing a temperature and/or a flow according to one embodiment of the present invention.

DESCRIPTION OF A PREFERRED EMBODIMENT OF THE INVENTION

FIG. 1 discloses a sensor 100 for sensing a temperature and/or a flow. This sensor comprises a substrate 102 consisting preferably of aluminium oxide having a purity of 96.5% to 99.5%, the rest of said substrate consisting of other oxides; said substrate 102 has arranged thereon a structured resistance layer 104. The resistance layer is a platinum-rhodium layer.

For producing the platinum-rhodium layer, a mixture consisting of a platinum resinate paste and of a rhodium resinate paste is used as a starting material. The platinum resinate paste contains 12% by weight of platinum, the rest of the paste consisting of an organic substance, and the rhodium resinate paste contains 7% by weight of rhodium, the rest of the paste consisting again of an organic substance.

In accordance with the preferred embodiment, these two pastes are mixed, a platinum-rhodium layer having a temperature coefficient of 3500 ppcm/°C. being obtained by mixing 99% of platinum resinate paste and 1% of rhodium resinate paste, when the method steps following hereinbelow are performed.

printing the mixed resinate paste by means of a screen printing process onto an aluminium oxide substrate having a layer thickness of approx. 15 μm;

drying the paste, which has been applied by printing, at 80° C. for a period of 10 minutes;

burning in the paste in a continuous burning-in stove at a temperature of approx. 800° C., whereby the layer thickness of the platinum-rhodium layer will be reduced to approx. 0.12 μm after the first burning, i.e. a large amount of the organic substance has been burnt out;

repeating the first three method steps on the same substrate until an overall layer thickness of 1.3 μm has been reached. This will require approx. 10 paste-applying printing processes and the respective subsequent method steps;

tempering the substrate with the overall layer thickness of 1.3 μm at a high temperature, preferably 1400° C., for a period of three hours plus the heating time and the slow cooling-down time so as to obtain the high and stable temperature coefficient of e.g. 3500 ppcm/°C.

The treatment at high temperatures in the method described hereinbefore has the effect that structural lattice defects are eliminated and that the platinum-rhodium layer is additionally purified, whereby organic-substance residues which are still contained in said layer will be removed.

It is obvious that the present invention is not limited to the ratio of platinum to rhodium described in connection with the above-mentioned embodiment. Depending on the desired temperature coefficient, which is aimed at for the sensor, various mixing ratios are obtained.

Instead of the substrate described hereinbefore, other carrier materials which are suitable for receiving thereon the structured resistance layer can be provided, the carrier being either insulating or non-insulating; in the latter case, a thin insulating layer is arranged between the surface of the carrier and the structured resistance layer.

I claim:

1. A method for producing a sensor which is used for sensing a temperature or a flow and which comprises a substrate and a structured resistance layer arranged on said substrate, comprising the following method steps:

a) providing a mixture consisting of a platinum resinate paste and a rhodium resinate paste, wherein the platinum resinate paste contains 12% by weight of platinum, the rest of said platinum resinate paste consisting of a resinate, and the rhodium resinate paste contains 7% by weight of rhodium, the rest of said rhodium resinate paste consisting of a resinate;

b) printing a layer of the mixture by means of a screen printing process onto said substrate;

c) drying the mixture;

d) burning in the mixture at such a temperature for such a period of time that a resinate component contained in the layer will be burnt out;

e) repeating steps b, c, and d on the same substrate until a desired overall mixture layer thickness has been obtained; and f) tempering the substrate with the whole layer so as to adjust the temperature coefficient.

2. A method for producing a sensor according to claim 1, characterized in that the paste is burnt in at a temperature of approx. 800° C.

3. A method according to claim 1, wherein said substrate consists of 96.5% to 99.5% aluminium oxide by weight, the rest of said substrate consisting of other oxides.

4. A method according to claim 1, characterized in that the ratio of platinum resinate to rhodium resinate is 99% by weight to 1% by weight.

5. A method for producing a sensor which is used for sensing a temperature or a flow and which comprises a substrate and a structured resistance layer arranged on said substrate, comprising the following method steps:

a) providing a mixture consisting of a platinum resinate paste and a rhodium resinate paste, wherein the platinum resinate paste contains 12% by weight of platinum, the rest of said platinum resinate paste consisting of a resinate, and the rhodium resinate paste contains 7% by weight of rhodium, the rest of said rhodium resinate paste consisting of a resinate;

b) printing a layer of the mixture by means of a screen printing process onto said substrate having a layer thickness of approximately 15 $\mu$m;

c) drying the mixture at 80° C. for a period of 10 minutes;

d) burning in the mixture in a continuous burning-in stove at a temperature of approximately 800° C., whereby the thickness of the platinum-rhodium layer will be reduced;

e) repeating steps b, c, and d on the same substrate until a desired overall platinum-rhodium layer thickness of 1.3 $\mu$m has been obtained; and f) tempering the substrate with the overall layer thickness of 1.3 $\mu$m at a temperature of 1400° C. for a period of three hours so as to adjust the temperature coefficient to 3500 ppcm/°C.

6. A method according to claim 5, wherein said substrate consists of 96.5% to 99.5% aluminium oxide by weight, the rest of said substrate consisting of other oxides.

* * * * *

UNITED STATES PATENT AND TRADEMARK OFFICE
CERTIFICATE OF CORRECTION

PATENT NO. : 5,853,793
DATED : December 29, 1998
INVENTOR(S) : Heinrich Zitzmann It is certified that error appears in the above-indentified patent and that said Letters Patent is hereby corrected as shown below:

In the title page, item [63] insert the following:

FOREIGN PATENT OR PUBLISHED FOREIGN PATENT APPLICATION

| | DOCUMENT NUMBER | PUBLICATION DATE | NAME | CLASS | SUBCLASS | TRANSLATION YES | NO |
|---|---|---|---|---|---|---|---|
| JP | 4 2 7 9 0 0 4 | 10/05/92 | Fuji Xerox Co. Ltd. | | | | |
| JP | 4 3 2 2 0 0 6 | 11/12/92 | Matsushita Electric Co. Ltd. | | | | |
| JP | 4 2 7 9 0 0 7 | 10/05/92 | Fuji Xerox Co. Ltd. | | | | |
| JP | 63 1 6 2 5 5 | 01/23/88 | Fuji Denki Co. Ltd. | | | | |

Signed and Sealed this

Ninth Day of November, 1999

Attest:

Q. TODD DICKINSON

Attesting Officer

Acting Commissioner of Patents and Trademarks